US010021673B2

(12) United States Patent
Prabhakar et al.

(10) Patent No.: US 10,021,673 B2
(45) Date of Patent: Jul. 10, 2018

(54) MECHANISMS FOR OPTIMIZING COMMUNICATIONS BAND SELECTION DEPENDING ON ONGOING QUALITY OF SERVICE

(71) Applicant: Apple Inc., Cupertino, CA (US)

(72) Inventors: Alosious Pradeep Prabhakar, Singapore (SG); Jose A. Castelo Vega, Tokyo (JP); Siddharth Pandey, San Jose, CA (US); Aditya A. Marawar, Santa Clara, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 15/080,725

(22) Filed: Mar. 25, 2016

(65) Prior Publication Data

US 2017/0280422 A1 Sep. 28, 2017

(51) Int. Cl.
*H04W 4/00* (2018.01)
*H04W 72/02* (2009.01)
(Continued)

(52) U.S. Cl.
CPC .............. *H04W 72/02* (2013.01); *H04W 4/90* (2018.02); *H04W 16/14* (2013.01); *H04W 48/18* (2013.01);
(Continued)

(58) Field of Classification Search
CPC ............................. H04W 72/0453; H04W 4/22
(Continued)

(56) References Cited

U.S. PATENT DOCUMENTS 9,301,221 B2 3/2016 Lee et al.
2012/0039167 A1* 2/2012 Swaminathan ..... H04W 76/026
370/225

(Continued)

FOREIGN PATENT DOCUMENTS

CN 103582084 A 2/2014

OTHER PUBLICATIONS

TSG RAN WG2, "LS on Use of Prioritising Channel Selection for Cell Selection Procedure", Document for Discussion/Decision, Oct. 11-13, 1999, 2 pages, Kyongju, Korea.

*Primary Examiner* — Rebecca E Song
(74) *Attorney, Agent, or Firm* — Meyertons Hood Kivlin Kowert & Goetzel, P.C.; Jeffrey C. Hood (57) ABSTRACT

A wireless communication device (UE) conducting wireless communications according to a specified radio access technology (RAT) in a first communications band belonging to a first network may be required to switch to a different communications band due to network restrictions and/or radio link failure. The UE may therefore perform a system scan identifying other communications bands associated with the first RAT and available at the present location of the UE. The UE may identify whether the other communications bands include preferred communications bands belonging to the first network, support a service associated with the wireless communications of the UE, and have an energy level higher than a specified threshold. If one or more preferred communications bands are present, the UE may switch communications from the first communications band to one of the preferred communications bands, even if it doesn't have the highest energy level among all the other communications bands.

20 Claims, 6 Drawing Sheets

(51) Int. Cl.
*H04W 72/04* (2009.01)
*H04W 16/14* (2009.01)
*H04W 48/18* (2009.01)
*H04W 4/90* (2018.01)
*H04W 36/00* (2009.01)

(52) U.S. Cl.
CPC .... *H04W 72/0453* (2013.01); *H04W 36/0022* (2013.01)

(58) Field of Classification Search
USPC ........................................................ 370/329
See application file for complete search history.

(56) References Cited

U.S. PATENT DOCUMENTS

| | | | |
|---|---|---|---|
| 2013/0252614 A1* | 9/2013 | Hsu ................... | H04W 36/0083 455/437 |
| 2015/0350918 A1* | 12/2015 | Rashid ................. | H04W 16/14 370/329 |
| 2016/0006531 A1* | 1/2016 | Kumar ................. | H04J 11/0086 455/434 |
| 2016/0119959 A1* | 4/2016 | Jung ................... | H04W 76/028 455/404.1 |
| 2016/0192251 A1* | 6/2016 | Chebolu ............... | H04W 48/16 455/404.1 |
| 2016/0381626 A1* | 12/2016 | Tsai ...................... | H04W 48/16 455/434 |

* cited by examiner

MECHANISMS FOR OPTIMIZING COMMUNICATIONS BAND SELECTION DEPENDING ON ONGOING QUALITY OF SERVICE

FIELD OF THE INVENTION

The present application relates to wireless communications, and more particularly to optimizing communications band (frequency band) selection depending on ongoing Quality of Service.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

The UEs, which may be mobile telephones or smart phones, portable gaming devices, laptops, wearable devices, PDAs, tablets, portable Internet devices, music players, data storage devices, or other handheld devices, etc. may have multiple radio interfaces that enable support of multiple radio access technologies (RATs) as defined by the various wireless communication standards (LTE, LTE-A, Wi-Fi, BLUETOOTH™, etc.). The radio interfaces may be used by various applications and the presence of the multiple radio interfaces may necessitate the UE to implement mobility solutions to seamlessly run applications simultaneously over multiple radio interfaces (e.g., over LTE/LTE-A and BLUETOOTH™) without impacting the end-to-end performance of the application. That is, the UE may need to implement mobility solutions to simultaneously operate multiple radio interfaces corresponding to multiple RATs (e.g., LTE/LTE-A and BLUETOOTH™).

In addition to the communication standards mentioned above, transition to next generation wireless technology introduced a transition from circuit-switched (CS) technology to packet-switched (PS) technology, such as voice over LTE (VoLTE), for conducting voice calls. VoLTE technology utilizes a fully packet-switched network and provides benefits such as improved audio quality (e.g., HD voice) and simultaneous voice and data communications for GSM, WDCMA, and CDMA carriers. In the course of developing and deploying VoLTE technology on various different wireless communications devices, e.g. mobile devices, certain benchmarks for VoLTE quality communications have been established. One example is a benchmark of "equal to or better than CS" for overall call quality, including call setup and call drop performance as well as voice quality. The purpose of this standard is to ensure that customers don't experience regression in the calling experience when VoLTE is introduced.

LTE and VoLTE also specifies, among others, various Quality of Service Class Identifier (QCI) requirements. QCI is a mechanism employed to ensure bearer traffic is allocated appropriate Quality of Service (QoS). QoS refers to the overall performance of a network, e.g. a wireless communications network such as an LTE network, and particularly to the performance seen by the users of the network. Different bearer traffic requires different QoS and therefore different QCI values, with nine (9) different QCI values currently specified. For example, the VoLTE QCI 1 requirements include a Packet Delay Budget (PDB) which defines an upper bound for the time that a packet may be delayed between the UE and the Policy and Charging Enforcement Function (PCEF).

Current UE implementations typically require an LTE full system scan during an ongoing GBR (guaranteed bit rate) service data communication flow over QCI 1 (e.g. either an emergency call or voice call). This could be observed in at least two user case scenarios. The first scenario is communication barred in specific operator bands for Emergency 911 calls, and the second scenario is a radio link failure which may be due to handover failure and/or Random Access Procedure (RACH) failure. With a full system scan based on energy, the UE tries to establish or recover service to the LTE frequency with higher energy, which is not the most efficient approach as communication can be interrupted based on network implementation access policy.

SUMMARY OF THE INVENTION

Embodiments are presented herein of, inter alia, of a system and methods for improved communications band (channel) selection depending on ongoing quality of service during wireless communications. Embodiments are further presented herein for wireless communication systems containing user equipment (UE) devices and/or base stations communicating with each other within the wireless communication systems.

In some embodiments, a UE device may conduct wireless communications over a Long Term Evolution (LTE) network over a specific communications (frequency band). When the UE needs to switch to a different communications band (or frequency band) due to some specific event, the UE may first perform a full system scan. The UE may then obtain—from the results of the full system scan—the respective energy levels of all the LTE frequencies present at the location of the UE, i.e. all the LTE frequencies available to the UE. The UE may then make a decision to select a preferred communications band from the available bands such that:

The preferred communications (frequency) band belongs to the last camped network, i.e. the network on which the UE is presently communicating or on which the UE was last communicating.

The preferred communications (frequency) band supports the ongoing quality of service QoS required for the UE to conduct the wireless communications.

The preferred communications (frequency) band has an energy level higher than a specified threshold value (which may be −105 dBm in some embodiments.)

Accordingly, in one set of embodiments, an apparatus may include a processing element that may cause a wireless communication device to conduct wireless communications as set forth below. The wireless communication device may be conducting wireless communications according to a first radio access technology (RAT) in a first communications band belonging to a first network. For example, the wireless communication device may communicate over an LTE network in a first frequency band, which may represent either a frequency division duplex (FDD) band or a time division duplex (TDD) band depending on the communications. For example, the UE may be presently conducting a voice over LTE (VoLTE) call where the first frequency band is an FDD band, or it may be attempting to establish an emergency (911) call. In response to an event causing the wireless communication device to have to switch to a different communications band, the wireless communication device may perform a system scan that identifies other communications bands available to the wireless communication device for conducting the wireless communications according to the first RAT. For example, if communicating over an LTE band, the wireless communication device may scan for other LTE bands available at the present location of the UE device.

Pursuant to the system scan, the wireless communication device may identify whether the other communications bands include one or more preferred communications bands which belong to the first network, support a service for the wireless communications conducted by the wireless communication device, (e.g. support an ongoing quality of service required for the wireless communication device to conduct the wireless communications), and have an energy level higher than a specified threshold (i.e. they are appropriate for reliably/effectively conducting wireless communications). In response to identifying that the other communications bands include the one or more preferred communications bands, the UE may switch communications from the first communications band to a selected communications band of the one or more preferred communications bands.

In some embodiments, the wireless communication device may have to switch to a different communications band because the wireless communication device is attempting to establish and conduct an emergency call, but the first communications band, on which the UE device was last communicating at the UE's present location, is barred from carrying emergency calls. In some embodiments, the wireless communication device may have to switch to a different communications band because the wireless communication device is experiencing a radio link failure while conducting voice communications over the first network which is a packet-switched network. For example, the wireless communication device may be conducting a VoLTE call when experiencing a radio link failure.

The selected communications band may have a highest energy level among the one or more preferred communications bands. Furthermore, at least one communications band of the other communications bands may belong to a second network, and may have the highest energy level among the other communications bands. However, by selecting the new communications band as described above, the time to reliably establish an emergency (911) call may be reduced by up to 50% in contrast to attempting to switch to the communications band with the highest energy level regardless of which network the communications band is affiliated with, and the call may be maintained under same network as VoLTE calls. Furthermore, when conducting VoLTE calls, the probability of radio resource control reestablishment being accepted may be increased while the probability of dropping VoLTE calls may be decreased.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

BS: Base Station
CDMA: Code Division Multiple Access
CFI: Control Frame Indicator
CSFB: Circuit-Switched Fallback
DL: Downlink (from BS to UE)
FDD: Frequency Division Duplexing
GBR: Guaranteed Bit Rate
GPRS: General Packet Radio Service
GSM: Global System for Mobile Communication
HO: Handover
LTE: Long Term Evolution
PDN: Packet Data Network
QCI: Quality of Service Class Identifier
QoS: Quality of Service
RACH: Random Access Procedure
RAT: Radio Access Technology
RF: Radio Frequency
RLF: Radio Link Failure
RRC: Radio Resource Control
SIP: Session Initiation Protocol
TDD: Time Division Duplexing
UE: User Equipment
UL: Uplink (from UE to BS)
UMTS: Universal Mobile Telecommunication System
VoLTE: Voice over LTE Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of electronic devices, e.g. computer system devices, which perform wireless communications such as wireless local area network (WLAN) communications, cellular communications according to one or more of a number of different cellular radio access technologies, Wi-Fi communications, and the like. The wireless communication device may wirelessly communicate through one or more respective radio frequency (RF) interfaces that facilitate such communications. As used herein, the term "wireless device" may refer to a UE device, as defined above, or to a stationary device, such as a stationary wireless client or a wireless base station. For example a wireless device may be any type of wireless station of an IEEE 802.11 system, such as an access point (AP) or a client station, or any type of wireless station of a cellular communication system communicating according to one or more cellular radio access technologies (e.g. LTE, CDMA, GSM), such as a base station (or cellular tower) or a cellular telephone, for example. A wireless device may communicate according to multiple different radio access technologies, for example over multiple RF interfaces.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
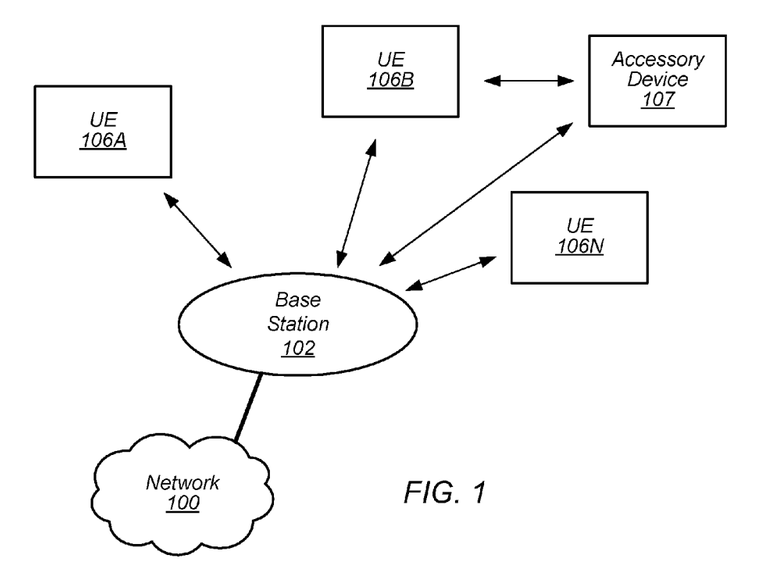
FIG. 1 illustrates an exemplary (and simplified) wireless communication system, according to some embodiments.
Figure 2:
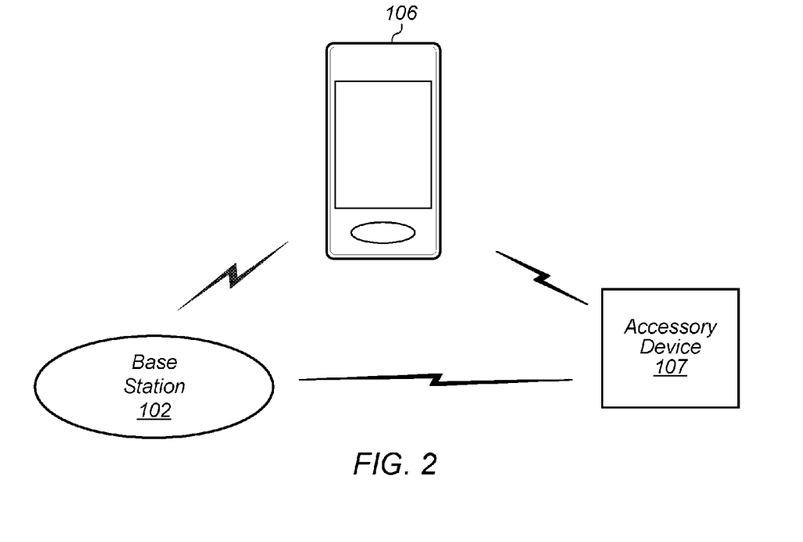
FIG. 2 illustrates an exemplary base station in communication with exemplary wireless user equipment (UE) and accessory device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N and accessory device 107. Each of the user devices and the accessory device may be referred to herein as a "user equipment" (UE) or UE device. Thus, the user devices 106 are referred to as UEs or UE devices. For the purposes of this disclosure, accessory device 107 may also be considered a UE device.

The base station 102 may be a base transceiver station (BTS) or cell site, and may include hardware that enables wireless communication with the UEs 106A through 106N and with accessory device 107. Accessory device 107 may also communicate directly with a UE device, e.g. with UE device 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In that sense, the base station 102 may be considered a part of network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 3GPP2 CDMA2000 (e.g., 1xRTT, 1xEV-DO, HRPD, eHRPD), Wi-Fi, WiMAX etc. In some embodiments, the base station 102 communicates with at least one UE/accessory device that performs optimized band (communication channel) selection depending on ongoing QoS as described herein.

UE 106/107 may be capable of communicating using multiple wireless communication standards. For example, a UE 106/107 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106/107 may be configured to operate with optimized communications band (channel) selection, at least according to the various methods as described herein. Base station 102 and other similar base stations operating according to the same or a different cellular communication standard may thus be provided as one or more networks of cells, which may provide continuous or nearly continuous overlapping service to UE 106/107 and similar devices over a wide geographic area via one or more cellular communication standards.

The UE 106/107 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) and accessory device 107 in communication with the base station 102, according to some embodiments. Accessory device 107 may also communicate with UE device 106. The UE 106 may be a device with wireless network connectivity such as a mobile phone, a hand-held device, a computer or a tablet, or virtually any type of wireless device. Similarly, accessory device may be a device with wireless network connectivity such as headphones, smart watch, smart glasses, and the like. The UE 106 and/or accessory device 107 may perform any of the method embodiments described herein. The UE 106 and accessory device 107 may be configured to communicate using any of multiple wireless communication protocols. For example, the UE 106 may be configured to communicate using any one or more of CDMA2000, LTE, LTE-A, WLAN, or GNSS. Accessory device may be configured to communicate using any one or more of WLAN, BLUETOOTH™, Wi-Fi, and/or any cellular radio access technologies. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
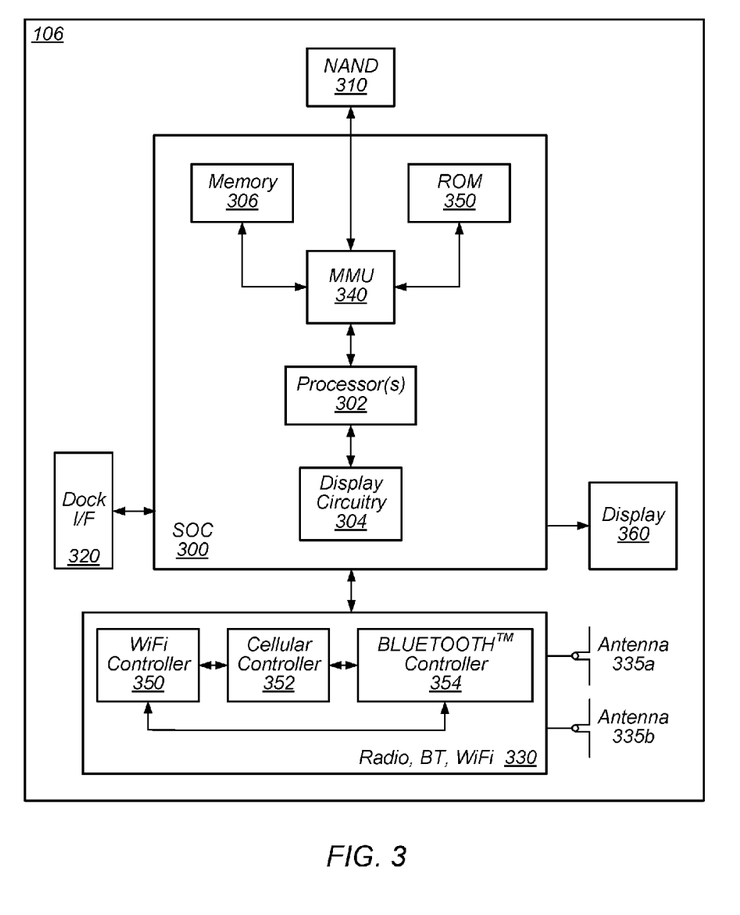
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform a full system scan when conducting wireless communications according to a RAT, e.g. LTE, to obtain the respective energy levels of all communications channels or bands (i.e. all the frequencies associated with the RAT and present at a current location of the UE), and make an optimized selection of which communications channel/band to use depending on ongoing QoS. Thus, in some embodiments, UE 106 may make a decision regarding a channel/band selection based at least on whether the scan results include: a frequency of the last camped network (i.e. the last network in which the UE was last camped), a frequency which supports the ongoing QoS of communications conducted by the UE, and a frequency capable of carrying wireless communications at power levels greater than a specified threshold (e.g. greater than −105 dBm). The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate selection of a communications channel/band for communications by UE 106 according to various embodiments disclosed herein. Specifically, processor(s) 302 may be coupled to and/or may interoperate with other components as shown in FIG. 3 to facilitate UE 106 communicating in a manner that seeks to optimize channel/band selection according to various embodiments described herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. LTE controller) 352, and BLUETOOTH™ controller 354, and in at least some embodiments, one or more or all of these controllers may be implemented as respective dedicated circuits for example integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106. Furthermore, similar to processor(s) 302, the various controllers 350, 352 and 354 may be implemented as a combination of hardware and software, using one or more processing elements (as described above with respect to the various terms used herein).

Figure 4:
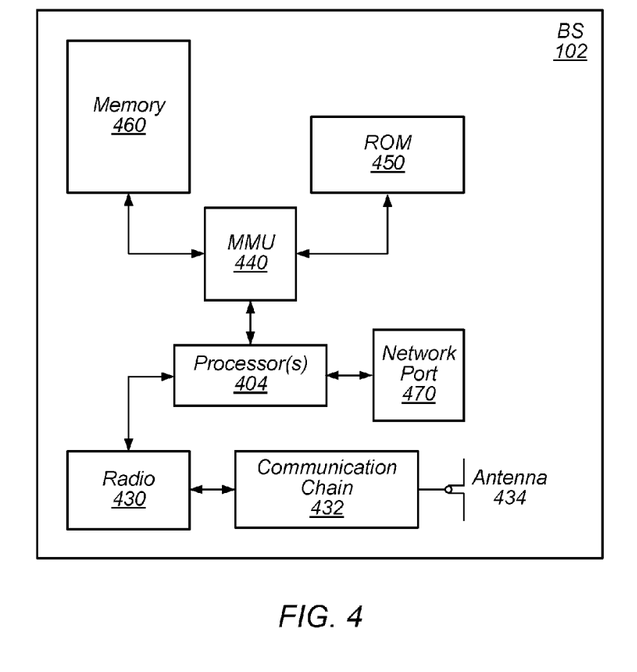
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein, e.g., by executing program instructions stored on a memory medium (e.g., a non-transitory computer-readable memory medium), for base station 102 to communicate with a UE device that performs optimized channel/band selection depending on ongoing QoS of the wireless communications performed by the UE device. Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices that select a communication channel/band based on ongoing QoS of the wireless communications performed by the UE device.

Channel/Band Selection

As previously mentioned, many wireless communications devices may be operated to conduct voice-calls using packet-switched (PS) technology, such as voice over LTE (VoLTE). VoLTE technology utilizes a fully packet-switched network and provides benefits such as improved audio quality (e.g., HD voice) and simultaneous voice and data communications for GSM, WCDMA and CDMA carriers. In addition, certain benchmarks have been established for VoLTE quality communications, e.g. "equal to or better than CS" for overall call quality, including call setup and call drop performance as well as voice quality. Furthermore, LTE and VoLTE also specifies various Quality of Service Class Identifier (QCI), which provide a mechanism to ensure bearer traffic is allocated appropriate Quality of Service (QoS). QoS refers to the overall performance of a network, e.g. a wireless communications network such as an LTE network, and particularly to the performance seen by the users of the network. Different bearer traffic requires different QoS and therefore different QCI values. For example, the VoLTE QCI 1 requirements define an upper bound for the time that a packet may be delayed between the UE and the Policy and Charging Enforcement Function (PCEF).

Current UE devices typically perform a full LTE system scan during an ongoing GBR (guaranteed bit rate) service data communication flow over QCI 1 (e.g. an emergency call conducted using the UE or a voice call conducted through the UE). There are at least two different conditions that may emerge or may be present when such communications are conducted by the UE. The first condition may the barring of communication in specific operator bands for Emergency 911 calls, and the second condition may be a radio link failure due to handover failure and/or Random Access Procedure (RACH) failure. With a full system scan predicated on energy (levels), the UE may try to establish or recover service to the LTE frequency with the highest energy. In some cases this may not be the most efficient approach, however, as communications may be interrupted based on certain factors, for example based on network implementation access policy.

It should be noted here that "frequency with the highest energy", or more broadly, the communications band with the highest energy refers to the communications band identified as the most favorable band in which wireless communications may be most reliably or effectively conducted based on the various measurement metrics related to the reliability of the communications band. Such measurement metrics may include (and are not limited to) Reference Signal Received Power, Reference Signal Received Quality, Reference Signal Strength Indicator, and/or Signal-To-Interference-Plus-Noise Ratio, among others. Accordingly, a communications band with "a highest energy level" may be the communications band considered the most preferred band for conducting wireless communications at least according to one or more of the above referenced measurement metrics and/or possibly other similar measurement metrics.

Figure 5:
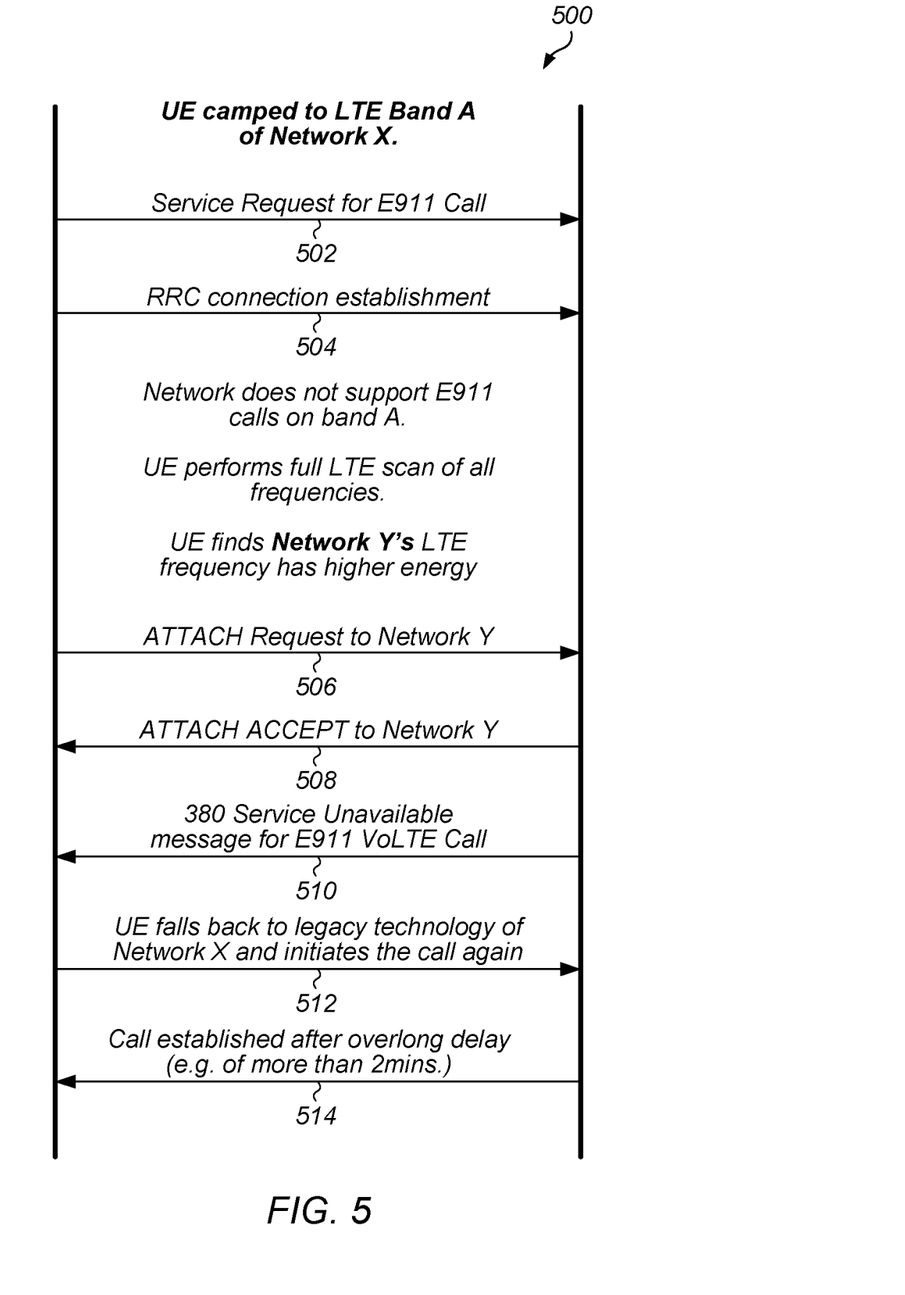
FIG. 5 shows an exemplary timing diagram illustrating one possible case study/scenario of a UE device selecting an operating channel/band during an emergency call.

FIG. 5—Case of an Emergency (911) call

FIG. 5 shows an exemplary timing diagram 500 illustrating one possible case study/scenario of a UE device selecting an operating channel/band during an emergency call. The UE may wirelessly communicate according to a specific RAT, in this case LTE. As shown in diagram 500, the UE may be camped on a specific first band, here referenced as Band A of a first network, here referenced as network X. Network X may have multiple bands available at the location from where the UE device is presently communicating, for example two bands, a first band referred to as band A, and a second band referred to as band B. However, for whatever reason, band A may be barred for emergency calls by network X.

The UE may initiate an emergency 911 call when camped in band A, by sending a service request for an emergency 911 call (502), and establishing a Radio Resource Control (RRC) connection (504). However, since band A is barred for emergency calls, the UE performs a full system scan of all frequencies (channels/bands) to find a suitable band for conducting the emergency call. Accordingly, the UE may choose a preferred (LTE) frequency based on which frequency—of all the frequencies identified during the full system scan—would allow for conducting communications at the highest energy level, independent of the network with which that frequency (band) is associated. In other words, the UE device may select, as the preferred frequency band, the frequency band that the UE has determined has the highest energy level regardless of which network that frequency band is located in.

Accordingly, the UE may determine that this preferred frequency band is in a second network, here referenced as network Y, and may therefore send an attach request to network Y (506), which may acknowledge and accept that request (508), allowing the UE to camp in the preferred band in network Y. At the same time, network X may include a second (LTE) frequency Band B at an energy level that is only slightly lower that the energy level of the preferred frequency band in network Y. For example, the energy level of band B may be lower than the energy level of the preferred band by only 2-3 dBm. Nevertheless, by selecting the frequency band with the highest energy level, the UE has selected the preferred frequency band in network Y. However, though camped on the preferred band in network Y, the UE may not be able to conduct the emergency call as the service for an emergency VoLTE call may not be available, and network Y may redirect the call with a 380 Alternate Service message to the UE (510). In that case the UE then falls back to the legacy technology of network X (e.g. either 1xCDMA or GSM/UMTS), and reinitiates the call (512), which may finally be established after a delay of some duration, which may be more than two minutes in many cases (514).

Due to the sequence of events described above, establishment of the emergency call may take much longer than desired, which is not acceptable for Emergency 911 calls as there may person(s) who might be in great danger. The above scenario is quite plausible with the energy level of a band in a second network exceeding the energy of an unbarred band in a first network in which the UE may be (or may have most recently been) camped, even if that energy difference may not be considered substantial (i.e. may not be higher by more than a specified threshold level).

Figure 6:
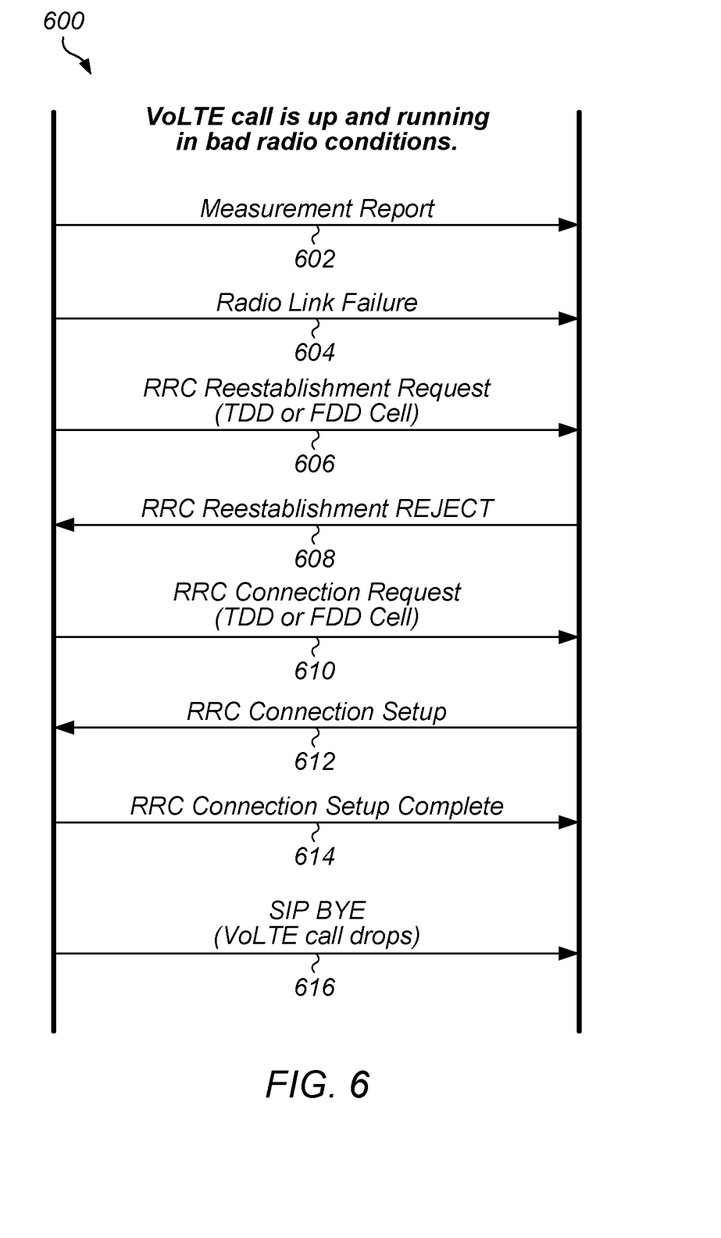
FIG. 6 an exemplary timing diagram illustrating one possible case study/scenario of a UE device selecting an operating channel/band and/or cell during a VoLTE call.

FIG. 6—Case of a (Regular) VoLTE Call

FIG. 6 shows an exemplary timing diagram 600 illustrating one possible case study/scenario of a UE device selecting an operating channel/band and/or cell during a (regular) VoLTE call. The UE may wirelessly communicate according to a specific RAT, in this case LTE. As shown in diagram 600, the UE may be camped on a first cell of a first type, e.g. an FDD cell. The UE may be conducting an ongoing VoLTE call when encountering bad RF conditions. The UE may thus perform a full system scan and send measurement reports to the network, with the measurement reports including measurement information corresponding to neighboring cells and pertaining to multiple communication types, e.g. pertaining to both TDD and FDD communications (602). However, before the network (i.e. the eNB or base station currently facilitating wireless communications of the UE device) may trigger a handover (HO) to a better cell (i.e. to a base station in a better coverage area), the UE may experience a Radio Link Failure (604).

In response to the Radio Link Failure (RLF), the UE may try to reestablish the RRC connection by sending an RRC Reestablishment Request message to another cell in the same communications channel/band or in a different band, for either TDD or FDD types of communication, whichever proves to have better radio conditions (606). That is, the UE may choose a preferred cell of the same frequency band or of a different frequency band (in which the UE was communicating) based on which would allow for conducting communications at the highest energy level, regardless of the type of communication (e.g. TDD or FDD). However, this preferred destination cell in the reestablishment request may happen to be a TDD cell, which doesn't support VoLTE communications, and therefore the RRC reestablishment is rejected by the cell by way of a reject message transmitted to the UE (608). In response to the rejected RRC reestablishment request, the UE may send out am RRC connection request to another cell (610), and that request may not be rejected (presumably because it is an FDD cell supporting VoLTE communications), leading to the UE receiving an RRC connection setup message (612). Once RRC connection setup is complete, the UE may signal this back to the network (614). However, due to the time that has elapsed during these signaling operations, by the time the RRC connection setup is complete, the Session Initiation Protocol (SIP) may time out and disconnect the call, causing the VoLTE call to drop (616).

The sequence of events described above illustrates very common and frequent signature failures observed around networks that facilitate multiple types of communications, e.g. both FDD and TDD communications, but where VoLTE communications may not be supported by one type of communications, e.g. VoLTE communications may only be supported by FDD.

Figure 7:
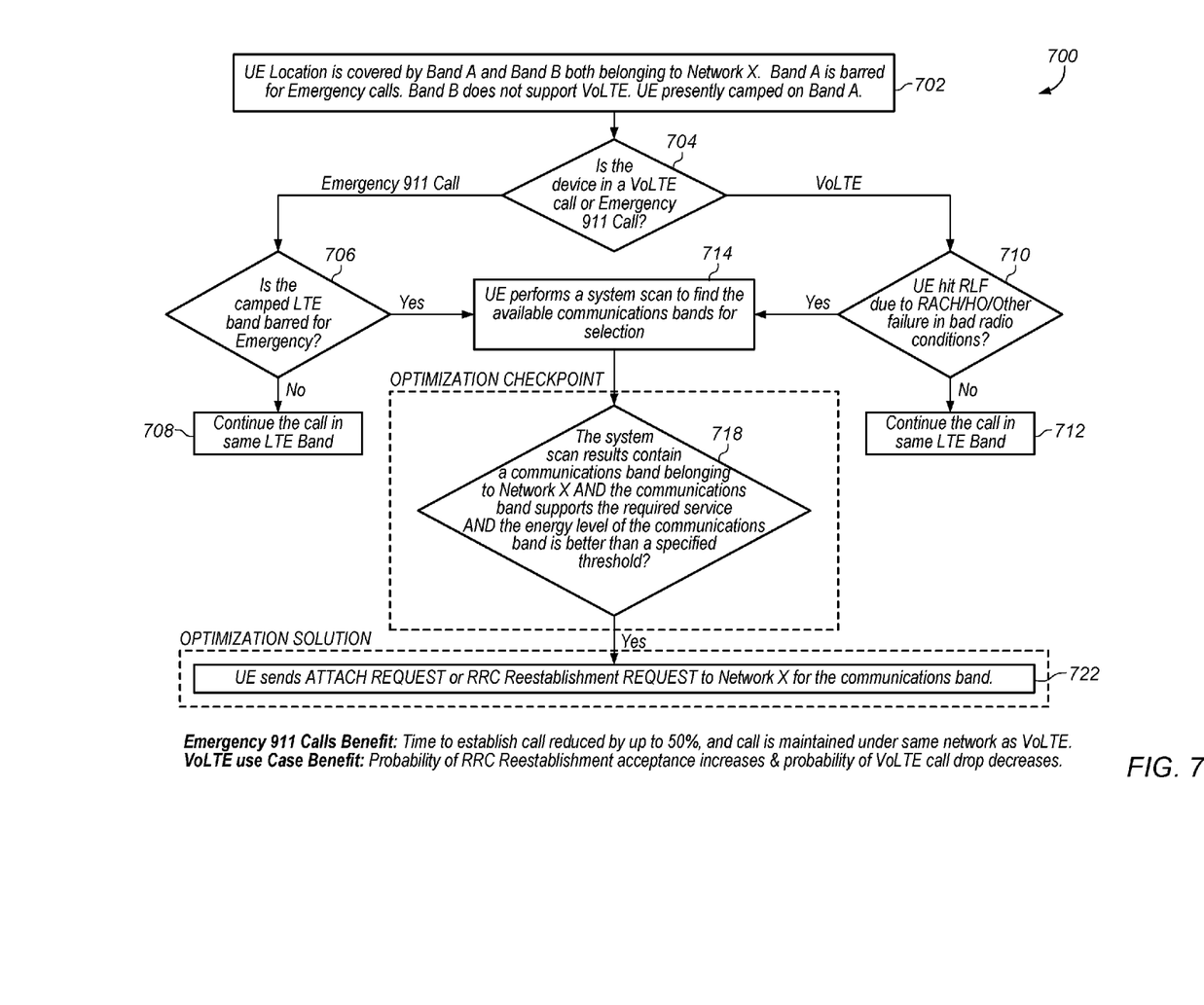
FIG. 7 shows a flow diagram of an exemplary method for optimized selection of a communications band and/or cell by a UE device, according to some embodiments.

FIG. 7—Optimized System (Band and/or Cell) Selection

FIG. 7 shows a flow diagram 700 of an exemplary method for selecting a communications band and/or cell in an optimized manner, according to some embodiments. The UE may wirelessly communicate according to a specific RAT, in this case LTE. As shown in diagram 700, the UE may be camped on a specific first communications channel or frequency band, here referenced as band A of a first network, here referenced as network X (702). Furthermore, network X may have multiple bands available at the location where the UE device is presently located and is communicating, for example two bands, the first band referred to as band A, and a second band referred to as band B (702). For whatever reason, band A may be barred for emergency calls by network X, and furthermore band B may not support certain types of packet-based communications, e.g. VoLTE communications (702). While camped in band A, the UE may be attempting to conduct an emergency 911 call, or it may presently be conducting standard (i.e. non-emergency) VoLTE communications (704).

Emergency Call Case

If the UE is attempting to initiate an emergency call, and the band in which is the UE is presently camped is not barred from making emergency calls, then the UE may proceed with the emergency call in the same band (708). However, if the band in which is the UE is presently camped is barred from making emergency calls, the UE may perform a system scan, e.g. a full system scan of all frequencies (channels/bands) associated with the first RAT, i.e. associated with LTE in this case, to find a suitable band for conducting the emergency call (714). Accordingly, the UE may identify a (LTE) communications/frequency (band) which—of all the frequencies identified during the system scan—would facilitate conducting wireless communications most reliably/effectively according to certain measured metrics associated with the frequency band as previously described, independent of the network with which that frequency (band) is associated. Accordingly, the UE may determine that this preferred frequency band is in a second (other) network. However, instead of selecting this frequency band outright, the UE may first go through a selection process for making an optimal band/channel selection (718).

Accordingly, the UE may determine based on the results of the system scan whether the scan results include one or more identified channels/bands within network X. The UE may also determine whether the one or more identified bands within network X support emergency calls, or more generally, whether they support the service for the wireless communications conducted by the UE. In some embodiments, in the context of LTE communications, the UE may determine whether the one or more identified bands within network X support an ongoing QoS for the communications conducted by the UE as part of determining whether the one or more identified bands support the service for the communications conducted by the UE. Finally, the UE may also determine whether the (respective) energy level(s) associated with the one or more identified bands meet at least a specified threshold value (e.g. higher than −105 dBm.) In other words, the UE may determine whether wireless communications may be effectively/reliably conducted in any of the one or more identified communications bands (according to certain measurement metrics as previously described). For example, the UE may determine that there is an identified available band within network X that supports emergency calls and has an associated energy level that is higher than the specified threshold (i.e. wireless communications may be reliably/effectively conducted in the identified available band within network X). Thus, in this case, even if the energy level of the identified available band is lower than the energy level of a frequency band of another network also included in the results of the full system scan, the UE may send an attach request to the identified available band (722) instead of sending the attach request for the frequency band of the other network. That is, even if the frequency band in the other network may be considered more favorable—according to the measurement metrics—for reliably conducting wireless communications than the identified available band within network X, the UE may still select the identified available band within network X, granted that the conditions in 718 are met.

Ongoing VoLTE Call Case

Referring back to decision marker 704, the UE may be presently conducting standard (i.e. non-emergency) VoLTE communications, in other words it may be conducting a VoLTE call (704). If the UE does not experience a radio link failure (RLF), then the UE may simply continue the call in the same band, i.e. the band in which the UE is currently camped, in this case band A in network X (712). The RLF may be caused by one or more of a variety of factors, for example a random access procedure failure or handover failure or any other failure due to bad radio conditions. On the other hand, if the UE does experience a radio link failure, the UE may perform a full system scan of all frequencies (channels/bands) of all communications types (e.g. TDD and FDD) associated with the first RAT, i.e. associated with LTE in this case, to find a suitable band and/or cell for continuing/conducting the VoLTE call (714). Accordingly, the UE may identify a (LTE) communications/frequency (band) which—of all the frequencies identified during the system scan—would facilitate conducting communications most reliably/effectively according to certain measured metrics associated with the frequency band as previously described, independent of the network and the communications type of the frequency (band). Accordingly, the UE may determine that this preferred frequency band is in a second (other) network, and/or is for a specific type of communications, e.g. for either TDD or FDD communications. However, instead of attempting to transmit an RRC reestablishment request for this frequency band outright, the UE may first go through the selection process for making an optimal band/channel selection (718).

Accordingly, similar to the previous case, the UE may determine based on the results of the system scan whether the scan results include one or more identified channels/bands within network X. The UE may also determine whether the one or more identified bands within network X support VoLTE calls, or more generally, whether they support the service for the wireless communications conducted by the UE. For example, FDD supports VoLTE calls while TDD does not support VoLTE calls. In some embodiments, in the context of LTE communications, the UE may determine whether the one or more identified bands within network X support an ongoing QoS for the communications conducted by the UE as part of determining whether the one or more identified bands support the service for the communications conducted by the UE. Finally, the UE may also determine whether the (respective) energy level(s) associated with the one or more identified bands meet at least a specified threshold value (e.g. higher than −105 dBm.) That is, the UE may determine whether wireless communications may be effectively/reliably conducted in any of the one or more identified communications bands, at least according to certain measurement metrics as previously described. For example, the UE may determine that there is an identified available band within network X that supports VoLTE calls (e.g. it may be an FDD band) and has an associated energy level that is higher than the specified/required threshold, that is, the wireless communications may be reliably/effectively conducted in the identified available band within network X. Thus, even if the energy level of the identified available band is lower than the energy level of a secondary frequency band within the same network, where the secondary frequency band also appears in the results of the full system scan, the UE may send an RRC reestablishment request for the identified available band (722) instead of sending the attach request for the secondary frequency band. That is, even if the frequency band in the other network may be considered more favorable—according to the measurement metrics—for reliably conducting wireless communications than the identified available band within network X, the UE may still select the identified available band within network X, granted that all conditions in 718 are met.

By selecting the band/channel according to the procedure exemplified in FIG. 7, the time to establish an emergency (911) call may be reduced by up to 50% when compared to the use case illustrated in FIG. 5, and the call may be maintained under same network as VoLTE communications (e.g. no need to fall back to a legacy CS network). For regular VoLTE calls that may be affected by RLF, by following the procedure exemplified in FIG. 7, the probability of RRC Reestablishment acceptance may be increased, while the probability of dropping the VoLTE call may be decreased.

Embodiments of the present invention may be realized in any of various forms. For example, in some embodiments, at least portions of the present invention may be realized as a computer-implemented method, a computer-readable memory medium, or a computer system. In other embodiments, at least portions of the present invention may be realized using one or more custom-designed hardware devices such as ASICs. In other embodiments, at least portions of the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a memory element configured to store information; and
a processing element configured to use at least some of the information stored in the memory element to cause a wireless communication device to:
conduct wireless communications according to a first radio access technology (RAT) in a first communications band belonging to a first network; and
in response to an event causing the wireless communication device to have to switch to a different communications band for conducting first wireless communications associated with a service:
perform a full system scan that identifies other communications bands available to the wireless communication device for conducting the wireless communications according to the first RAT;
identify whether the other communications bands comprise one or more preferred communications bands which:
belong to the first network;
support the service; and
have an energy level higher than a specified threshold; and
switch communications from the first communications band to a selected communications band of the one or more preferred communications bands, in response to identifying that the other communications bands comprise the one or more preferred communications bands.

2. The apparatus of claim 1, wherein the event comprises one of:
a first event comprising the wireless communication device attempting to conduct an emergency call, wherein the first communications band is barred from carrying emergency calls; or
a second event comprising the wireless communication device experiencing a radio link failure while conducting voice communications, wherein the first network is a packet-switched network.

3. The apparatus of claim 2, wherein in response to the first event, in order to switch to the selected communications band, the processing element is configured to cause the wireless communication device to send an attach request for the selected communications band to the first network.

4. The apparatus of claim 2, wherein in response to the second event, in order to switch to the selected communications band, the processing element is configured to cause the wireless communication device to send a radio resource control reestablishment request for the selected communications band to the first network.

5. The apparatus of claim 2, wherein when the wireless communication device switches to the selected communications band in response to the second event, the selected communications band is a frequency division duplex frequency band.

6. The apparatus of claim 1, wherein the selected communications band has a highest energy level among the one or more preferred communications bands.

7. The apparatus of claim 1, wherein the one or more preferred communications bands which support the service are communications bands which support an ongoing quality of service for the wireless communication device to conduct the first wireless communications.

8. The apparatus of claim 1, wherein at least one communications band of the other communications bands:
belongs to a second network; and
has a highest energy level among the other communications bands.

9. A non-transitory memory element storing instructions executable by a processing element to cause a wireless communications device to:
conduct wireless communications according to a specified radio access technology (RAT) in a first communications band belonging to a first network;
identify other communications bands available to the wireless communication device for conducting wireless communications according to the specified RAT;
identify whether the other communications bands comprise one or more preferred communications bands which:
belong to the first network;
support a service associated with the wireless communications conducted by the wireless communication device; and
have an energy level higher than a specified threshold; and
switch communications from the first communications band to a selected communications band of the one or more preferred communications bands, in response to identifying that the other communications bands comprise the one or more preferred communications bands.

10. The non-transitory memory element of claim 9, wherein the instructions are further executable by the processing element to cause the wireless communication device to identify the other communications bands through a full system scan performed in response to an event causing the wireless communication device to have to switch to a different communications band from the first communications band.

11. The non-transitory element of claim 10, wherein the event comprises one of:
a first event comprising the wireless communication device attempting to conduct an emergency call, wherein the first communications band is barred from carrying emergency calls; or
a second event comprising the wireless communication device experiencing a radio link failure while conducting voice communications, wherein the first network is a packet-switched network.

12. The non-transitory memory element of claim 11, wherein the instructions are further executable by the processing element to cause the wireless communication device to perform one or more of the following:
send an attach request for the selected communications band to the first network in response to the first event; or
send a radio resource control reestablishment request for the selected communications band to the first network in response to the second event.

13. The non-transitory memory element of claim 11, wherein the one or more preferred communications bands which support the service are communications bands which support an ongoing quality of service for the wireless communication device to conduct the wireless communications.

14. The non-transitory memory element of claim 9, wherein the selected communications band has a highest energy level among the one or more preferred communications bands.

15. The non-transitory memory element of claim 9, wherein at least one communications band of the other communications bands:
belongs to a second network; and
has a highest energy level among the other communications bands.

16. A wireless communication device comprising:
radio circuitry comprising one or more antennas for facilitating wireless communications according to a first radio access technology (RAT); and
a processing element coupled to the radio circuitry and configured to interoperate with the radio circuitry to cause the wireless communication device to:
conduct wireless communications according to a specified radio access technology (RAT) in a first communications band belonging to a first network;
identify other communications bands available to the wireless communication device for conducting wireless communications according to the specified RAT;
identify whether the other communications bands comprise one or more preferred communications bands which:
belong to the first network;
support a service associated with the wireless communications conducted by the wireless communication device; and
have an energy level higher than a specified threshold; and
switch communications from the first communications band to a selected communications band of the one or more preferred communications bands, in response to identifying that the other communications bands comprise the one or more preferred communications bands.

17. The wireless communication device of claim 16, wherein the processing element is configured to interoperate with the radio circuitry to further cause the wireless communication device to identify the other communications bands in response to one of:
the wireless communication device attempting to conduct an emergency call, wherein the first communications band is barred from carrying emergency calls; or
the wireless communication device experiencing a radio link failure while conducting voice communications, wherein the first network is a packet-switched network.

18. The wireless communication device of claim 16, wherein the selected communications band has a highest energy level among the one or more preferred communications bands.

19. The wireless communication device of claim 16, wherein the one or more preferred communications bands which support the service are communications bands which support an ongoing quality of service for the wireless communication device to conduct the wireless communications.

20. The wireless communication device of claim 16, wherein at least one communications band of the other communications bands:
belongs to a second network; and
has a highest energy level among the other communications bands.

* * * * *